US012559393B2

(12) United States Patent
Davies et al.

(10) Patent No.: US 12,559,393 B2
(45) Date of Patent: Feb. 24, 2026

(54) DESALINATION SYSTEM AND METHOD

(71) Applicant: THE UNIVERSITY OF BIRMINGHAM, Birmingham (GB)

(72) Inventors: Philip Davies, Birmingham (GB); Timothy Naughton, Coventry (GB); Liam Burlace, Birmingham (GB); Kiho Park, Birmingham (GB)

(73) Assignee: THE UNIVERSITY OF BIRMINGHAM, Birmingham (GB)

( * ) Notice: Subject to any disclaimer, the term of this patent is extended or adjusted under 35 U.S.C. 154(b) by 399 days.

(21) Appl. No.: 18/251,623

(22) PCT Filed: Nov. 5, 2021

(86) PCT No.: PCT/GB2021/052880
§ 371 (c)(1),
(2) Date: May 3, 2023

(87) PCT Pub. No.: WO2022/096895
PCT Pub. Date: May 12, 2022

(65) Prior Publication Data
US 2023/0406730 A1 Dec. 21, 2023

(30) Foreign Application Priority Data
Nov. 5, 2020 (GB) ...................................... 2017512

(51) Int. Cl.
B01D 61/02 (2006.01)
B01D 61/08 (2006.01)
(Continued)

(52) U.S. Cl.
CPC ............ C02F 1/441 (2013.01); B01D 61/025 (2013.01); B01D 61/08 (2013.01); B01D 61/12 (2013.01);
(Continued)

(58) Field of Classification Search
CPC .... C02F 1/441; C02F 1/008; C02F 2201/005; C02F 2209/03; C02F 2209/05;
(Continued)

(56) References Cited

U.S. PATENT DOCUMENTS 498,330 A 5/1893 Towle
4,983,301 A 1/1991 Szücz et al.
(Continued)

FOREIGN PATENT DOCUMENTS

CN 1486214 A 3/2004
CN 1668872 A 9/2005
(Continued)

OTHER PUBLICATIONS

English translation of WO_2014061948, Apr. 24, 2014. (Year: 2014).*
(Continued)

*Primary Examiner* — Joseph W Drodge
(74) *Attorney, Agent, or Firm* — David D. Brush; Westman, Champlin & Koehler, P.A.

(57) ABSTRACT

A desalination system and a method for operating the desalination system. An example desalination system includes a partitioned container, a membrane container housing a cross-flow semipermeable membrane, a feed pump for supplying saline water, a recirculation pump, a main valve, a bypass valve and a purge valve. The system operates in a first pressurisation stage where saline water is provided by the feed pump while the bypass valve is open, followed by a second pressurisation stage where an upstream compartment of the container is filled and a recharge stage where the main valve is closed and concentrated saline water is purged via the purge valve. An inlet
(Continued)

valve may be provided, which is closed in the first pressuri-sation stage and open in the second pressurisation stage and recharge stage.

16 Claims, 4 Drawing Sheets

(51) Int. Cl.

| | |
|---|---|
| *B01D 61/12* | (2006.01) |
| *B01D 63/10* | (2006.01) |
| *B01D 65/02* | (2006.01) |
| *C02F 1/00* | (2023.01) |
| *C02F 1/44* | (2023.01) |

(52) U.S. Cl.
CPC ............. *B01D 63/10* (2013.01); *B01D 65/02* (2013.01); *C02F 1/008* (2013.01); *B01D 2313/243* (2013.01); *B01D 2315/10* (2013.01); *B01D 2321/04* (2013.01); *C02F 2201/005* (2013.01); *C02F 2209/03* (2013.01); *C02F 2209/05* (2013.01); *C02F 2301/043* (2013.01); *C02F 2301/046* (2013.01); *C02F 2303/16* (2013.01)

(58) Field of Classification Search
CPC .......... C02F 2301/043; C02F 2301/046; C02F 2303/16; C02F 2103/08; C02F 2209/40; C02F 2303/10; C02F 1/44; B01D 61/025; B01D 61/08; B01D 61/12; B01D 63/10; B01D 65/02; B01D 2313/243; B01D 2315/10; B01D 2321/04; B01D 61/06; B01D 2311/14; B01D 2313/18; B01D 2313/246; B01D 61/02; B01D 2311/25; B01D 2311/252; B01D 2311/2523; B01D 2313/24; Y02A 20/131; F16K 17/04; F16K 17/30
See application file for complete search history.

(56) References Cited

U.S. PATENT DOCUMENTS

| | | | |
|---|---|---|---|
| 10,166,510 B2 | 1/2019 | Warsinger et al. | |
| 11,890,578 B2 * | 2/2024 | Davies .................... | F16K 17/30 |
| 2015/0231571 A1 * | 8/2015 | Volker ................. | B01D 61/025 |
| | | | 210/636 |
| 2015/0375174 A1 * | 12/2015 | Agnihotri .............. | B01D 61/58 |
| | | | 210/257.2 |
| 2016/0250595 A1 * | 9/2016 | Takahashi ............... | C02F 1/008 |
| | | | 210/652 |

| | | | |
|---|---|---|---|
| 2017/0239620 A1 | 8/2017 | Warsinger et al. | |
| 2018/0104648 A1 | 4/2018 | Oklejas, Jr. | |
| 2021/0002160 A1 * | 1/2021 | Van Gils .............. | B01D 61/025 |
| 2021/0299613 A1 | 9/2021 | Davies | |

FOREIGN PATENT DOCUMENTS

| | | | | |
|---|---|---|---|---|
| CN | 1721048 A | 1/2006 | | |
| CN | 1733615 A | 2/2006 | | |
| CN | 1852758 A | 10/2006 | | |
| CN | 100341609 C | 10/2007 | | |
| CN | 105073230 A | 11/2015 | | |
| CN | 112789244 A | 5/2021 | | |
| ES | 2396280 A1 | 2/2013 | | |
| KR | 20170004630 A | 1/2017 | | |
| WO | WO-2014061948 A1 * | 4/2014 | ............. | B01D 61/08 |
| WO | WO-2020039158 A1 * | 2/2020 | ............. | B01D 61/06 |

OTHER PUBLICATIONS

International Search Report dated Jul. 12, 2019 for corresponding International Application No. PCT/GB2019/051208, May 1, 2019.
Written Opinion of the International Searching Authority dated Jul. 12, 2019 for corresponding International Application No. PCT/GB2019/051208, filed May 1, 2019.
Davies et al., "A desalination system with efficiency approaching the theoretical limits", Desalination and Water Treatment—accepted Mar. 13, 2016.
Ali et al., "Off-grid desalination for irrigation in the Jordan Valley", Presented at the plenary session on 'Water Across Borders' of 'Desalination for the Environment: Clean Water and Energy', Sep. 3-6, 2018, Athens, Greece.
Communication under Rule 71(3) EPC dated Aug. 16, 2022 for related European Application No. 19 723 170.7.
First Chinese Office Action dated Aug. 1, 2022 for corresponding Chinese Application No. 201980064950.1.
Chinese Search Report dated Jul. 21, 2022 for corresponding Chinese Application No. 201980064950.1.
International Search Report dated May 4, 2022 for corresponding International Application No. PCT/GB2021/052880, filed Nov. 5, 2021.
Written Opinion of the International Searching Authority dated May 4, 2022 for corresponding International Application No. PCT/GB2021/052880, filed Nov. 5, 2021.
Great Britain Search Report under Section 17(5) dated Mar. 25, 2021 for corresponding Great Britain Application No. 2017512.1, filed Nov. 5, 2020.
Notice of Allowance and Fee(s) Due and Examiner Initiated Interview Summary for U.S. Appl. No. 17/270,227, mailed Dec. 11, 2023, 11 pages.
Chinese First Office Action and Search Report dated May 12, 2025 for corresponding Chinese Application No. 202180078399.3.

* cited by examiner

DESALINATION SYSTEM AND METHOD

CROSS-REFERENCE TO RELATED APPLICATIONS

This Application is a Section 371 National Stage Application of International Application No. PCT/GB2021/052880, filed Nov. 5, 2021, which is incorporated by reference in its entirety and published as WO 2022/096895 A2 on May 12, 2022, in English.

FIELD OF THE INVENTION

The invention relates to a desalination system and a method of operating a desalination system.

BACKGROUND

Desalination systems have many industrial applications. One application is the separation of potable water from groundwater that is saline and therefore unfit for drinking. Other applications include the treatment of seawater and of saline effluents produced by textile factories.

In desalination applications, there frequently arises the need to maximise the recovery, which is the volume of freshwater produced at the output of the system as a fraction of the volume of saline water supplied at the input. A higher recovery is desired to maximise the useful output of the system and to minimise the required input.

WO 2020/039158 A1 discloses a system and method for batch reverse osmosis that is capable of achieving a high recovery ratio (defined as the volume ratio between clean water output and feed water input), requiring only two pumps and three valves, which avoids the complexity of some earlier designs. A problem, however, is that the recovery ratio of a batch reverse osmosis system depends on the size of the vessels in the system, with a higher recovery ratio requiring a larger pressure vessel. As the recovery ratio approaches unity the vessel becomes unrealistically large, putting a limit on practical implementations. Different techniques such as semi-batch reverse osmosis can avoid the need for larger pressure vessels but have a disadvantage of a larger energy requirement as the recovery ratio is increased. It would therefore be advantageous to provide a system and method that is capable of a high recovery ratio with low energy consumption along with a compact size.

SUMMARY OF THE INVENTION

In accordance with the invention there is provided a desalination system comprising:

a partitioned container housing a movable partition partitioning the container into an upstream compartment and a downstream compartment each of variable volume, the partitioned container having a first inlet port at an upstream end of the container, a second inlet port at a downstream end of the container and an outlet port at the downstream end of the container;

a membrane container housing a cross-flow semipermeable membrane dividing the membrane container into a saline compartment and a desalinated compartment, the saline compartment comprising first and second cross-flow ports, the desalinated compartment comprising a desalinated water outlet port;

a feed pump for supplying saline water having an inlet and an outlet;

a recirculation pump having an inlet connected to the second cross-flow port and an outlet connected to the second inlet port to feed saline water into the downstream compartment;

a main valve connected between the outlet port and the first cross-flow port;

a bypass valve connected between the feed pump outlet and the second cross-flow port; and a purge valve connected on one side to the first cross-flow port and the main valve and on another side to a purge port.

An advantage of the desalination system is that the arrangement of vessels and valves allows for the system to be operated in both semi-batch and batch mode, resulting in a hybrid mode that combines the advantages of both by enabling a high recovery rate with a low energy consumption and a compact size.

The desalination system may further comprise an inlet valve connected between the feed pump outlet and the first inlet port. The system can, however, work without an inlet valve because in practice, whenever the bypass valve is open, fluid from the feed pump will tend to flow preferentially through the bypass valve rather than through the first inlet port into the partitioned container, providing the bypass valve and the first inlet port of the partitioned container are proportioned appropriately. An advantage of not having the inlet valve is that fewer moving parts are required in the system, while an advantage of the inlet valve being present is having more control over operation of the desalination system.

The desalination system may comprise a controller connected and configured to operate the desalination system, the controller configured to:

in a first pressurisation stage, in which the inlet valve, if present, and purge valve are closed and the bypass valve and main valve are open, operate the recirculation pump to recirculate saline water through the saline compartment and operate the feed pump to provide a supply of saline water to the saline compartment;

in a second pressurisation stage, in which the bypass valve and purge valve are closed and the inlet valve, if present, and main valve are open, operate the feed pump to provide a supply of saline water to the upstream compartment of the partitioned container, causing the partition to move and thereby flowing saline water from the downstream compartment into the saline compartment of the membrane container; and in a recharge stage, in which the inlet valve, if present, bypass valve and purge valve are open and the main valve is closed, operate the recirculation pump and feed pump to feed saline water to the second inlet of the partitioned container and into the saline compartment of the membrane container via the second cross-flow port, causing saline water to flow out through the purge port via the first cross-flow port.

The controller may be configured and connected to control operation of one or more, and optionally all, of the main valve, purge valve, inlet valve, if present, and bypass valve.

The inlet valve, if present, may be configured to open when a pressure between the feed pump and the inlet valve rises above a threshold pressure level. The bypass valve may be configured to close when a pressure between the feed pump and the bypass valve rises above the threshold pressure level.

The controller may be configured to open the inlet valve, if present, and close the bypass valve to end the first pressurisation stage and begin the second pressurisation stage. The end of the first pressurisation stage and the start of the second pressurisation stage may be determined in a number of ways. In a first example, the desalination system comprises a pressure sensor arranged to measure pressure of saline water provided by the feed pump, the controller being configured to open the inlet valve, if present, and close the bypass valve when a pressure between the feed pump and the inlet valve, or between the feed pump and the first inlet port, rises above a threshold pressure level. In a second example, the desalination system comprises a conductivity sensor arranged to measure electrical conductivity of saline water passing through the recirculation pump, the controller being configured to open the inlet valve, if present, and close the bypass valve when a conductivity of saline water flowing through the recirculation pump rises above a threshold conductivity level. In a third example, the controller is configured to open the inlet valve, if present, and close the bypass valve when a threshold volume of saline water has been provided by the feed pump in the first pressurisation stage. This may be determined by measuring flow of saline water, for example knowing the pumping rate of the feed pump. With a known pumping rate, the threshold volume may be determined by a time threshold.

According to a second aspect there is provided a method of operating a desalination system, the desalination system comprising:

a partitioned container housing a movable partition partitioning the container into an upstream compartment and a downstream compartment each of variable volume, the partitioned container having a first inlet port at an upstream end of the container, a second inlet port at a downstream end of the container and an outlet port at the downstream end of the container;

a membrane container housing a cross-flow semipermeable membrane dividing the membrane container into a saline compartment and a desalinated compartment, the saline compartment comprising first and second cross-flow ports, the desalinated compartment comprising a desalinated water outlet port;

a feed pump for supplying saline water having an inlet and an outlet;

a recirculation pump having an inlet connected to the second cross-flow port and an outlet connected to the second inlet port to feed saline water into the downstream compartment;

a main valve connected between the outlet port and the first cross-flow port;

a bypass valve connected between the feed pump outlet and the second cross-flow port; and a purge valve connected on one side to the first cross-flow port and the main valve and on another side to a purge port, the method comprising:

in a first pressurisation stage, in which the purge valve is closed and the bypass valve and main valve are open, operating the recirculation pump to recirculate saline water through the saline compartment and operating the feed pump to provide a supply of saline water to the saline compartment;

in a second pressurisation stage, in which the bypass valve and purge valve are closed and the main valve is open, operating the feed pump to provide a supply of saline water to the upstream compartment of the partitioned container, causing the partition to move and thereby flowing saline water from the downstream compartment into the saline compartment of the membrane container; and in a recharge stage, in which the bypass valve and purge valve are open and the main valve is closed, operating the recirculation pump and feed pump to feed saline water to the second inlet of the partitioned container and into the saline compartment of the membrane container via the second cross-flow port, causing saline water to flow out through the purge port via the first cross-flow port.

The desalination system may comprise an inlet valve connected between the feed pump outlet and the first inlet port. The inlet valve is closed in the first pressurisation stage and open in the second pressurisation stage and the recharge stage.

The first and second pressurisation stages and the recharge stage may be repeated in sequence.

The first pressurisation stage may end and the second pressurisation stage begin when a pressure in saline water fed by the feed pump rises to a threshold pressure level.

The first pressurisation stage may end and the second pressurisation stage begin when an electrical conductivity of saline water passing through the recirculation pump rises to a conductivity threshold level.

The first pressurisation stage may end and the second pressurisation stage begin when a threshold volume of saline water provided by the feed pump during the first pressurisation stage is reached.

BRIEF DESCRIPTION OF THE DRAWINGS

The invention is described in further detail below by way of example and with reference to the accompanying drawings, in which.

DETAILED DESCRIPTION OF ILLUSTRATIVE EMBODIMENTS

Figure 1:
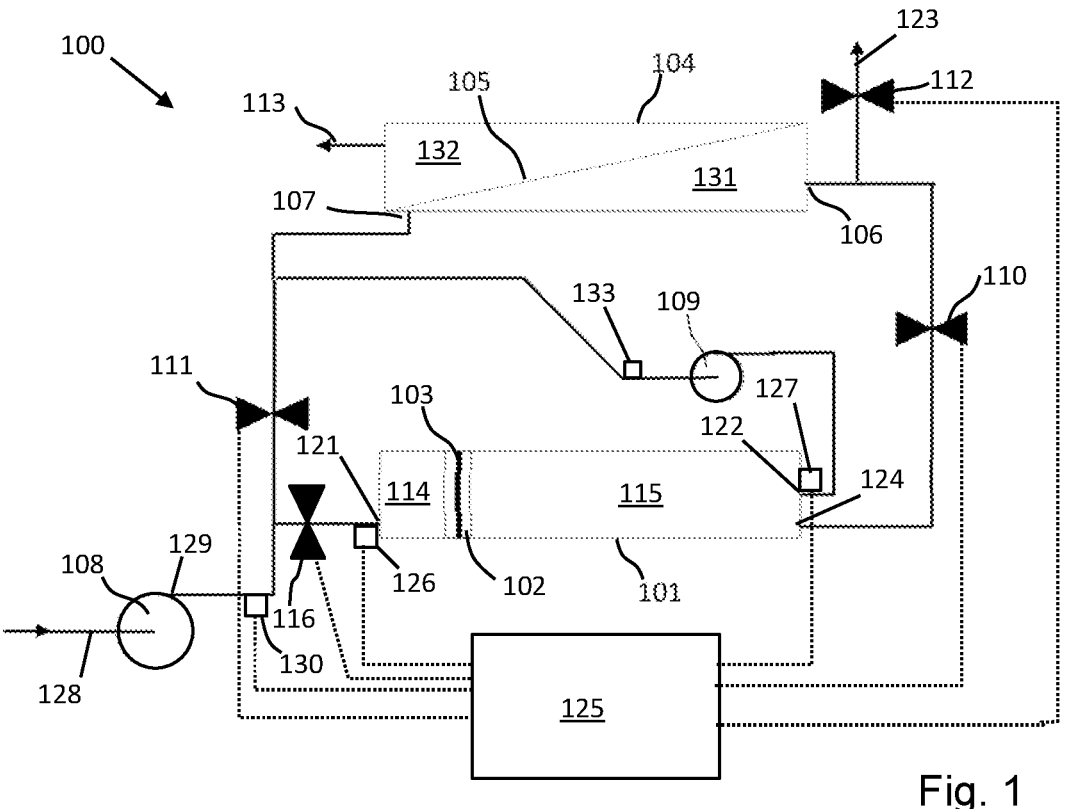
FIG. 1 is a schematic diagram of an example desalination system.

The desalination system illustrated in FIG. 1 comprises a first partitioned container 101 and a second membrane container 104. The partitioned container 101 is divided by a mobile partition or piston 102 into an upstream compartment 114 and a downstream compartment 115. A supply of pressurised saline water is provided by a feed pump 108 and a feed of desalinated water is provided at an outlet port 113. A semipermeable membrane 105 divides the membrane container 104 into a saline compartment 131 and a desalinated compartment 132. The partitioned container 101 may be a cylindrical vessel housing a piston 102, where the piston 102 is slidably mounted within the cylindrical vessel 101. The vessel 101 may be made from a glass-reinforced plastic, stainless steel or some other material resistant to pressure and to corrosion by saline water. The internal diameter of the vessel 101 may typically be four inches (approximately 10.2 cm). The piston 102 may be machined to a diameter just less than four inches, enabling it to slide freely inside the cylindrical vessel 101. To prevent water from leaking between the compartments either side of the piston, the piston may be fitted with an O-ring seal 103. Alternatively the piston 102 may be machined to a sufficiently close tolerance to prevent significant leakage, and therefore without need for any seal.

The vessel 104 containing the membrane 105 may be in the form of a second cylindrical vessel housing a semipermeable membrane element 105 of a type that allows a cross flow to occur, as it is important to sweep concentrated saline solution from the surface of the membrane 105. First and second cross-flow ports 106 and 107 allow the cross flow to respectively enter and leave the vessel 104 in both directions, i.e. flowing in through the second cross-flow port 107 and out through the first cross-flow port 106, and vice versa. The membrane element 105 used may be of a spiral-wound reverse osmosis type, such as is commonly used in the desalination industry. Hollow-fibre or flat-sheet reverse osmosis membranes may also be used.

The system 100 comprises a first high-pressure feed pump 108 and a second low-pressure recharge or recirculation pump 109. The feed pump 108 provides a supply of saline water to a first inlet 121 of the cylindrical vessel 101 via an inlet valve 116 and/or to a recharge or recirculation circuit via a bypass valve 111. As explained above, the inlet valve 116 may be omitted without affecting operation of the system 100. The bypass valve 111 is connected between the outlet 129 of the feed pump 108 and the second cross-flow port 107 and allows, when opened, saline water from the feed pump 108 to bypass the cylindrical vessel 101 and flow into the a recirculation loop comprising the saline compartment 131 of the membrane container 104 and the recirculation pump 109. A purge valve 112 connected between the first cross-flow port 106 and a purge outlet 123 allows, when opened, concentrated saline water from the saline compartment 131 of the membrane container 104 to flow from the first cross-flow port 106 to the purge outlet 123. A main valve 110 connected between the first cross-flow port 106 and an outlet port 124 of the partitioned container 101 allows, when opened, saline water to flow from the outlet 124 to the first cross-flow port 106 of the membrane container 104. Valves 110, 111, 112, 116 (if present) may be solenoid valves. To minimise the electrical power consumption in actuating the valves, the main valve 110 and inlet valve 116 (if present) may be of normally-open type, whereas the bypass valve 111 and purge valve 112 may be of normally-closed type. The valves 110, 111, 112 may be motorised or pneumatically actuated or may in some cases, in particular for the bypass, main and inlet valves 111, 110, 116 be pressure actuated, as for example disclosed in WO 2020/039158 A1.

An electrical control unit or controller 125 is connected and configured to operate the valves 110, 111, 112, 116, which may be done in response to sensors 126, 127 arranged to detect the position of the piston 102. A first sensor 126 may be provided at the first inlet 121 to detect when the piston 102 has moved back to the starting position, i.e. the upstream end towards the first inlet 121 end of the vessel 101. A second sensor 127 may be provided at the second inlet 122 to detect when the piston 102 has moved to the downstream end of the vessel 101. The sensors 126, 127 may be pressure or flow sensors. For a pressure sensor, a pressure rise in the upstream or downstream compartments 114, 115 will result when the piston 102 reaches either end of the vessel 101, which can be detected by the relevant sensor 126, 127. A pressure difference between sensors 127, 126 positioned at or near the outlet 124 and inlet 121 respectively may be used to detect when the piston 102 has reached either end of the vessel 101. For a flow sensor, a reduction in flow rate will result when the piston 102 reaches either end of the vessel 101. The first sensor 126 may for example be a pressure sensor, as the pressure available from the first pump 108 is larger. The second sensor 127 may be a flow sensor, since the pressure variation will be less when the piston 102 has returned to the upstream end of the vessel 101. In an alternative arrangement, the sensors 126, 127 may be proximity sensors, configured to provide a signal when the piston 102 is in proximity of the sensor, thereby detecting when the piston 102 is at the upstream or downstream end of the partitioned container 101.

A further pressure sensor 130 positioned between the feed pump outlet 129 and the inlet valve 116 (if present) may be provided to sense the pressure of the liquid being provided to the system 100 via the feed pump 108. This pressure can be used to trigger operation of the system to switch from a first to a second stage, as described in more detail below. A conductivity sensor 133 may alternatively or additionally be provided, the output from which could be used to detect the concentration of salt within the recirculation loop and trigger the system to switch from the first to second stages, as described in further detail below. The conductivity sensor 133 may be positioned on either side of the recirculation pump 109 or the main valve 110 in order to measure the electrical conductivity of saline water passing through the recirculation pump 109.

The various components of the desalination system 100 may be connected by pressure- and corrosion-resistant pipes, as indicated by solid lines in FIG. 1. These pipes are typically constructed of polyvinyl chloride or of stainless steel and connected by screw threads or flanges using techniques that will be well known to those skilled in the art of designing and constructing desalination system.

Saline feed water enters the system at the inlet 128 of the feed pump 108 and is separated into desalinated water that leaves via the outlet or permeate port 113, while concentrated saline water leaves via the purge valve 112 and purge port 123. The method of operation by which this separation is achieved comprises three stages comprising first and second pressurisation stages followed by a purge-refill stage, as explained below with reference to FIGS. 2, 3 and 4 respectively. In these figures, pipes carrying a flow of water are indicated by solid lines while those carrying no flow are indicated by broken lines. Flow is switched on and off by valves 110, 111, 112 and 116, whether by pressure activation or under control of the controller 125. Closed positions of the valves 110, 111, 112 are indicated by solid shading, whereas open positions are indicated by valves drawn in outline without shading.

Figure 2:
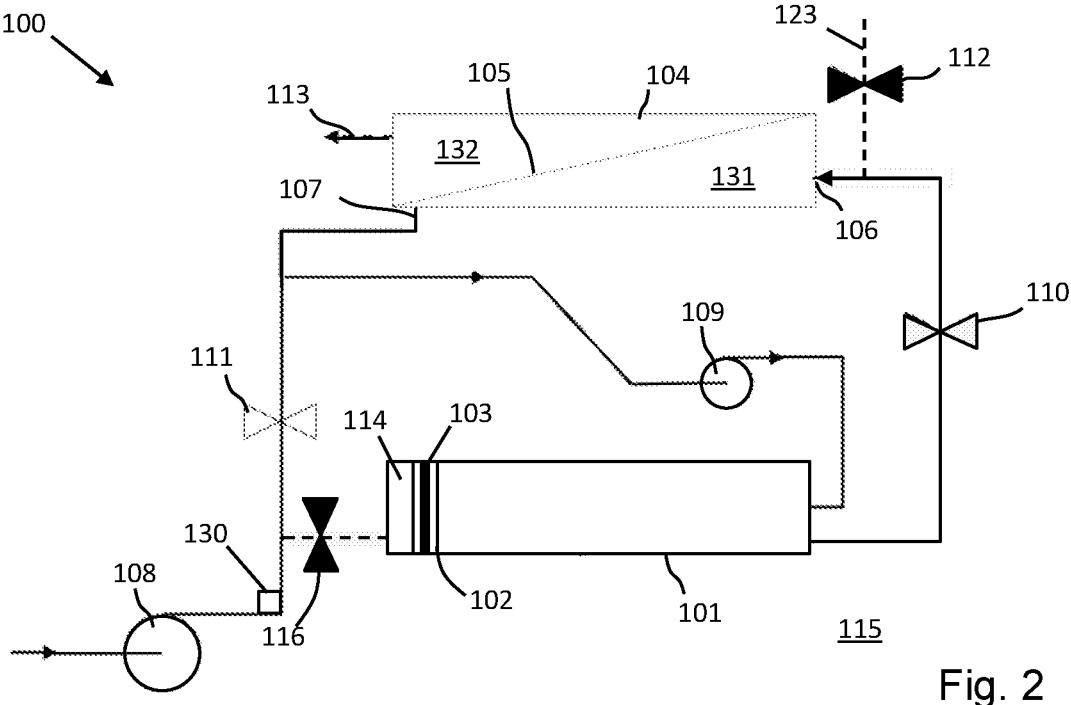
FIG. 2 is a schematic diagram of the example desalination system in a first stage of operation.

In a first stage, as illustrated in FIG. 2, the inlet valve 116 and purge valve 112 are closed while the main valve 110 and bypass valve 111 are open. In some examples the inlet valve 116 may be omitted because flow provided by the feed pump 108 will tend to preferentially flow through the bypass valve 111 without the inlet valve 116 being provided. The feed pump 108 and recirculation pump 109 are operated, the feed pump 108 providing a supply of saline water to a recirculation circuit comprising the saline compartment 131 of the membrane container 104 and pipes connecting the second cross-flow port 107 to the first cross-flow port 106 via the recirculation pump 109 and the main valve 110. The recirculation circuit also includes a portion of the downstream compartment 115 of the container 101 as flow passes into the compartment 115 through the second inlet port 122 and out of the compartment 115 through the outlet 124. Because the inlet valve 116 is closed, or because flow from the feed pump 108 flows preferentially through the bypass valve 111, the piston 102 is stationary during the first stage and the amount of salt within the recirculation loop gradually increases as the pressure increases. Desalinated water is output during the first stage via the permeate outlet port 113.

Figure 3:
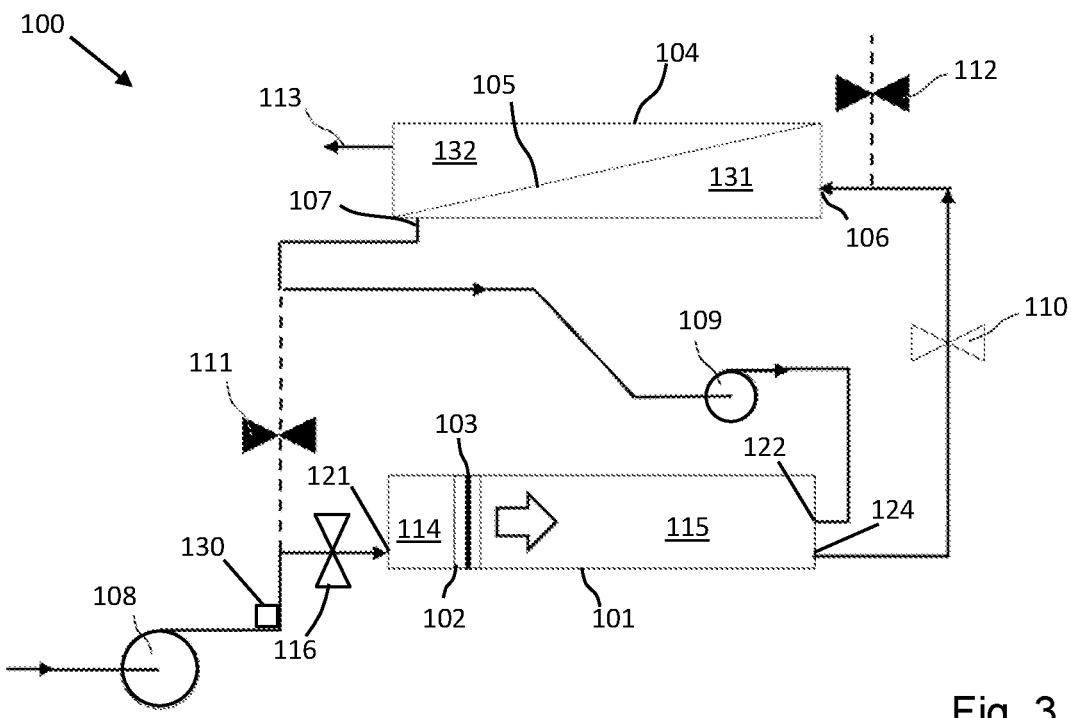
FIG. 3 is a schematic diagram of the example desalination system in a second stage of operation.

Once a threshold has been reached, which may be once the saline water pressure, as measured by pressure sensor 130, has risen to a threshold level, once the concentration of salt within the recirculation loop has reached a threshold level as measured by the sensor 133, or once a predetermined volume of saline water has been pumped into the system by the feed pump 108, as determined by a volume or time measurement, the system switches from the first stage to a second stage, as illustrated in FIG. 3. In this stage, the bypass valve 111 and purge valve 112 are closed while the inlet valve 116 (if present) and main valve 110 are open. The feed pump 108 and recirculation pump 109 continue operation. The transition from the first stage to the second stage is therefore effected by closing the bypass valve and opening the inlet valve 116 (if present). This may be done by actuating the valves 111, 116 using the controller 125 (see FIG. 1) or by actuating the bypass valve 111 alone if the inlet valve 116 is not present.

As the second stage progresses, further saline water is provided by the feed pump 108, which in this stage does not add to the recirculation circuit but instead fills the upstream compartment 114 of the partitioned container 101, causing the piston 102 to move to the right as shown in FIG. 3, reducing the size of the downstream compartment 115 and adding the contents of the downstream compartment 115 to the recirculation circuit. This results in further desalinated water being output from the outlet port 113 and the pressure rises further.

Figure 4:
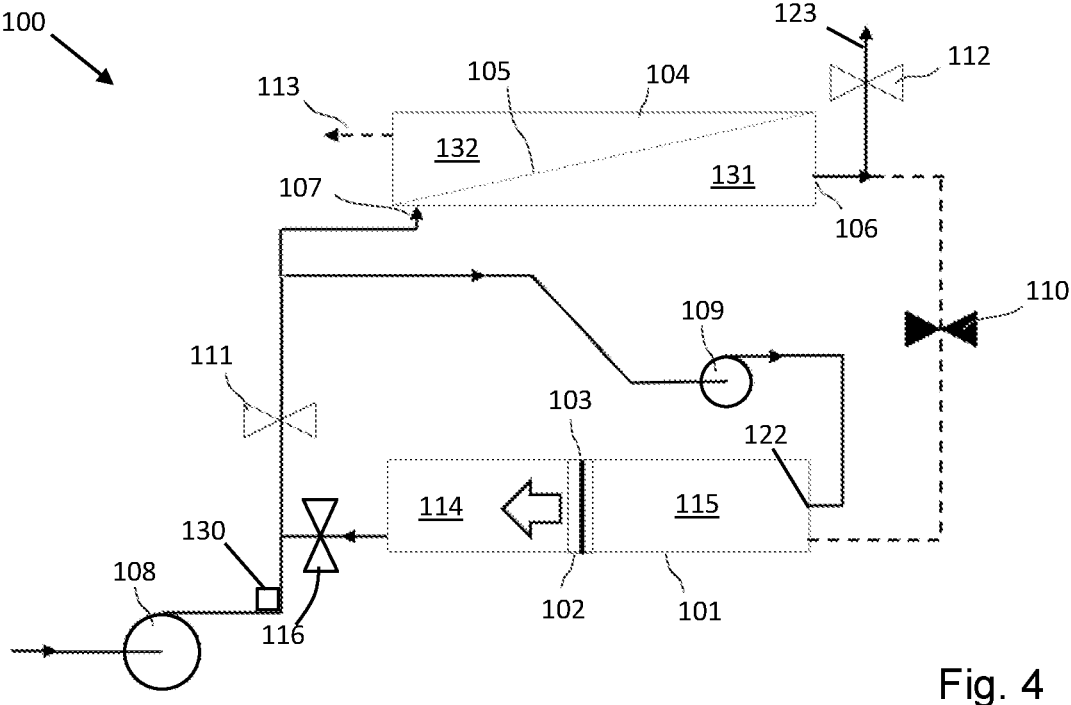
FIG. 4 is a schematic diagram of the example desalination system in a third stage of operation.

The end of the second stage is reached once the piston 102 has reached the end of the partitioned container 101, i.e. when the upstream compartment 114 is maximised and the downstream compartment 115 is minimised. At that point the third stage begins, which is shown in FIG. 4. In the third stage, the inlet valve 116 (if present), bypass valve 111 and purge valve 112 are open, while the main valve 110 is closed. Transitioning from the second stage to the third stage therefore involves opening the bypass valve 111, opening the purge valve 112 and closing the main valve 110. The feed pump 108 and recirculation pump 109 continue operation. Saline water from the feed pump 108 is fed via the bypass valve 111 into the saline compartment 131 of the membrane container 104, flushing concentrated saline water out of the first cross-flow port 106 and out through the purge port via the purge valve 112. Simultaneously, the recirculation pump 109 feeds saline water into the downstream compartment 115 of the partitioned container 101, causing the volume of the upstream compartment 114 to reduce as the downstream compartment 115 fills with saline water. Once the downstream compartment 115 is maximised and the upstream compartment 114 minimised, the third stage ends and the process may then repeat by progressing again to the first stage.

Figure 5:
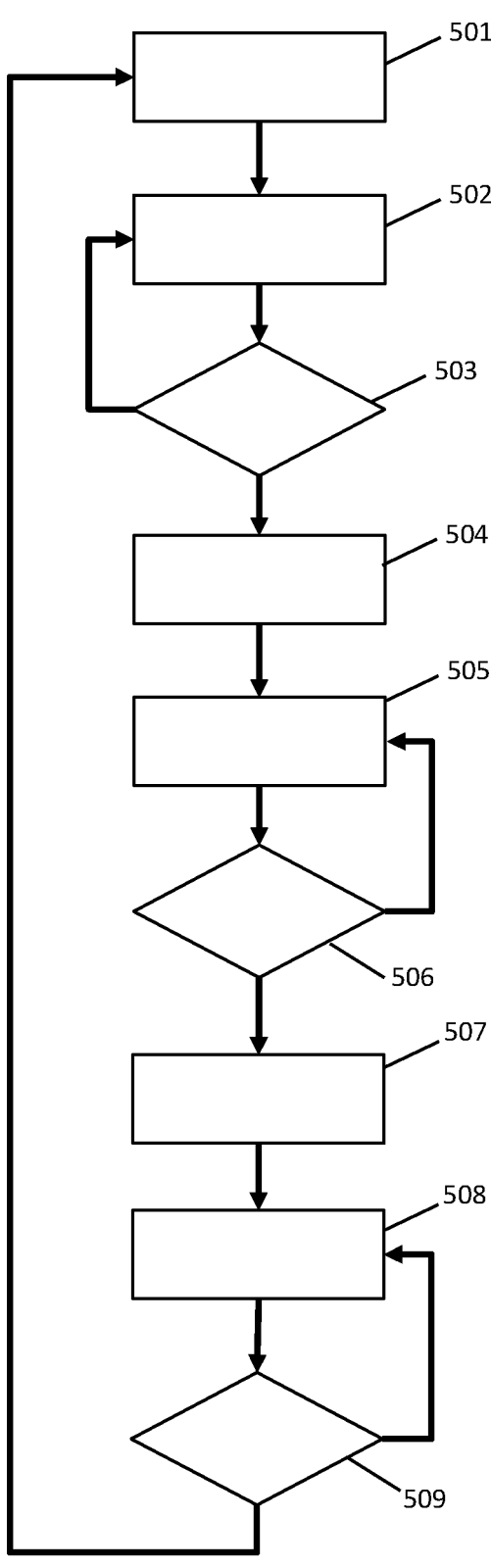
FIG. 5 is a schematic flow diagram illustrating an example method of operating a desalination system.

FIG. 5 illustrates in schematic form an example method of operation for a desalination system of the types described above. In a first step 501, the inlet valve 116 (if present) and purge valves 112 are closed and the bypass valve 111 and main valve 110 are open. In a second step 502, the feed pump 108 and recirculation pump 109 are operated to supply saline water to the recirculation circuit. As the pressure within the circuit rises, desalinated water is output from the permeate port 113. In a third step 503, a check is made to determine whether a pressure, salt concentration, volume of saline water or time threshold has been reached. In one example, the pressure is monitored (for example by measuring pressure with pressure sensor 130) and checked against a pressure threshold value. In another example, the salinity of water within the recirculation loop is measured by the conductivity sensor 133 and checked against a conductivity threshold. In other examples a volume of water provided by the feed pump may be checked against a volume threshold or a time threshold may be checked. This repeats until the threshold is reached, at which point the method proceeds to step 504 where the bypass valve 111 is closed and the inlet valve 116 (if present) is opened. The feed pump 108 and recirculation pump 109 then continue to operate (step 505) and a check is made at step 506 on the position of the piston 102 within the partitioned container 101. Once the piston 102 has reached the downstream end of the partitioned container 101 and the upstream compartment 114 is maximised, the method then proceeds to step 507, at which point the purge valve 112 is opened, the main valve 110 is closed and the bypass valve 111 is opened. The feed pump 108 and recirculation pump 109 continue to operate (step 508). A check is made (step 509) to determine when the piston 102 has reached the upstream end of the partitioned container 101, i.e. when the upstream compartment 114 is minimised and the downstream compartment is maximised. Once this happens, the process then repeats by proceeding back to step 501.

Figure 6:
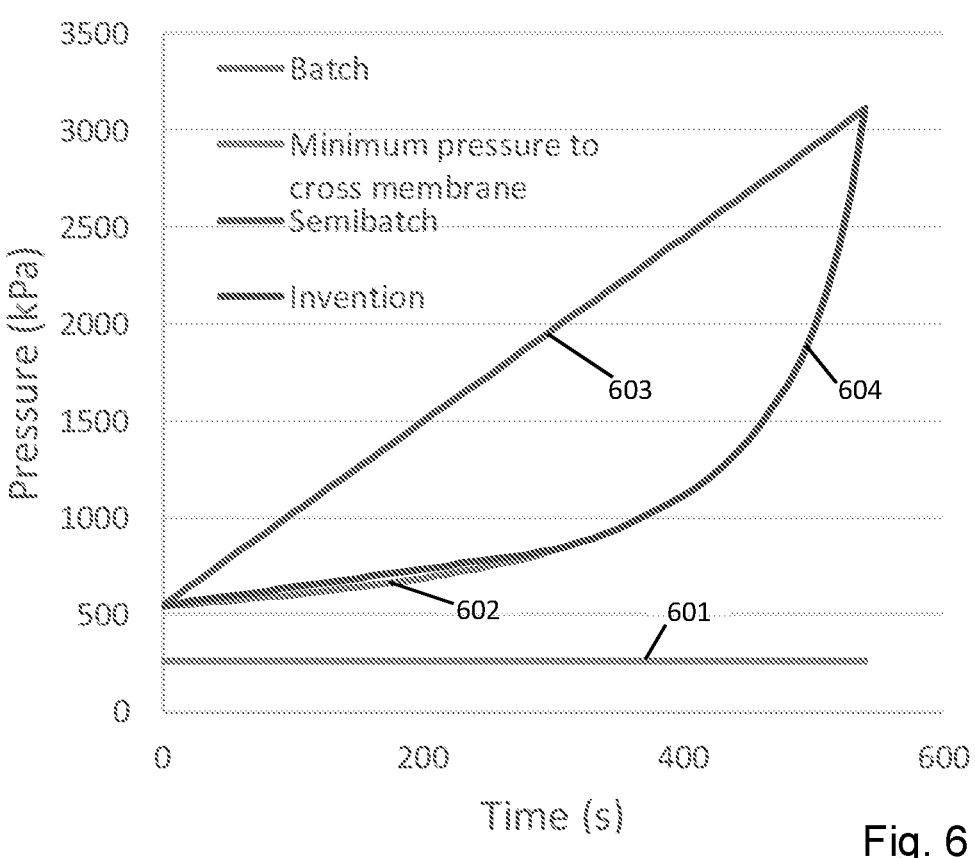
FIG. 6 is a plot of pressure as a function of time for different types of desalination systems.

FIG. 6 illustrates pressure as a function of time for different types of desalination processes. A minimum pressure 601 of around 250 kPa is required to cause desalinated water to cross the membrane. In a batch process, the pressure 602 rises from just over 500 kPa to around 800 kPa after around 300 seconds, at which point the process ends. In a semi-batch process, for example the process as described in WO 2020/039158 A1, the pressure 603 rises roughly linearly from the same starting point to around 3100 kPa. In the process as described herein, the pressure 604 initially rises in a similar way to the batch process 602 because saline water is fed directly through to the saline compartment 131 of the membrane container 104. In practice, the pressure may be slightly higher than that for the semi-batch process during this stage, but the difference is not significant in terms of the overall energy consumption. Once the pressure has risen to the threshold level of around 800 kPa, i.e. the end point of the first pressurisation stage, the second stage as described above begins and the pressure continues to rise until it reaches a similar maximum to that of the semi-batch process, for example around 3100 kPa, at which point the process proceeds to the third stage to flush and recharge.

An advantage of the process and system described herein is that the total energy used per cycle is lower. The energy used is related to the area under each pressure curve in FIG. 6. The area under pressure curve 604 is clearly substantially smaller than that under pressure curve 603. The vessel size for an equivalent efficiency may be more than halved using a system of the type described herein as compared to a system of the type described in WO 2020/039158 A1, for example reducing a vessel from around 135 litres to around 60 litres with a similar specific energy of around 0.38 kWh/m$^3$ with feedwater having 3 g of salt per litre at 25° C. and a 90% recovery rate.

Figure 7:
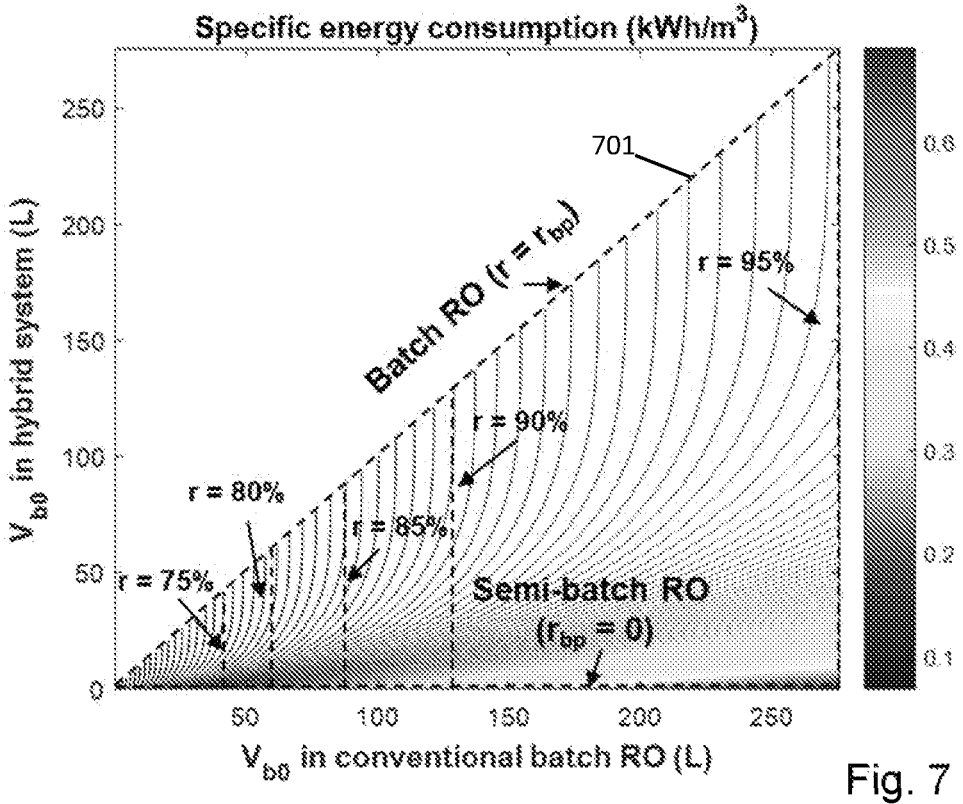
FIG. 7 is a contour plot illustrating batch volume for a hybrid desalination system against that for a conventional batch reverse osmosis system.

As a further example, to show the relation between the size and specific energy consumption of an exemplary embodiment of the invention compared to previous systems, the contour plot in FIG. 7 illustrates batch volume $V_{b0}$ for the hybrid system described herein against that for a conventional batch reverse osmosis (RO) system. The horizontal axis shows the vessel size in the batch RO system described in WO 2020/039158 A1 and the vertical axis that in the hybrid system of the type described herein. Designs of batch system lie on the diagonal line 701, this giving the largest vessel size. Designs of an example semi-batch system, based on U.S. Pat. No. 498,330, lie on the horizontal axis such that the vessel size is zero. The hybrid designs are those in the lower triangle bounded by those two extremes, with specific energy consumption represented by the contours. The contours show that a substantial reduction in vessel size causes only a small penalty in energy consumption. For example, at 95% recovery, reducing the vessel size from 275.7 litres to 97.1 litres will result in a specific energy consumption (SEC) increase of only 0.0107 kWh/m$^3$ from the batch RO system (0.2079 kWh/m$^3$). Although the vessel size is three times smaller, the energy penalty of the hybrid process is very small (less than 5%). The SEC of the hybrid system is 0.2184 kWh/m$^3$, which is substantially low compared to 0.6921 kWh/m$^3$ for the semi-batch system.

An example desalination system 100 according to the present disclosure was constructed with a partitioned container 101 having an internal diameter of 24 cm, the partitioned container housing a piston 102 providing a swept length of 155 cm, giving a displaced volume of 70 litres. A membrane container 104 was provided with an internal diameter of cm and internal length of 1 m, housing a semipermeable membrane 105 with a surface area of 40 m$^2$. Other components of the system were provided as in the embodiments described herein, with a concentration sensor 133 being provided in the recirculation loop.

The example desalination system 100 was used to desalinate saline water containing sodium chloride with a concentration of 0.85 g/l. The feed pump 108 was operated to supply water to the system at a flow rate of 12 litres per minute. The recirculation flow provided by the recirculation pump 109 was set to a substantially larger flow of 42 litres per minute. Initially, during the first pressurisation stage (i.e. semi-batch mode), the purge valve 112 and inlet valve 116 were closed while the main valve 110 and bypass valve 111 were open. Permeate flowed out of the system at a rate of 12 litres per minute. The concentration of salt in the recirculation loop of the system gradually increased, causing the pressure in the system to increase accordingly. The controller 125 monitored this concentration with the conductivity sensor 133 and detected when it exceeded a threshold level of 4 g/l. The controller 125 then switched the system to the second pressurisation stage (i.e. batch mode) by closing the bypass valve 111 and opening the inlet valve 116. This caused the piston 102 to move in the direction of the downstream compartment 115, while permeate continued to exit at 12 litres per minute. The recirculation loop concentration then increased more rapidly, until the piston 102 reached the end of its stroke, at which point the controller 125 opened the purge valve 112 and bypass valve 111, and closed the main valve 110 (while the inlet valve 116 remained open) thus starting the recharge stage. Brine was collected during the recharge stage and its salinity was measured as 15.1 g/l, which was 17.8 times more concentrated than the feed water salinity. In total, 363 litres of permeate was collected during the test, compared to 379 litres of feed water supplied. This corresponded to a recovery of 96%. The hydraulic work needed to power the system was also measured as the total work of the two pumps 108, 109, according to the displaced volume and average pressure supplied by each pump. The specific energy consumption of the system 100 was thus determined to be 0.5 kWh per cubic metre of permeate output.

Other embodiments are intentionally within the scope of the invention as defined by the appended claims.

The invention claimed is:

1. A desalination system comprising:
   a partitioned container housing a movable partition partitioning the container into an upstream compartment and a downstream compartment each of variable volume, the partitioned container having a first inlet port at an upstream end of the container, a second inlet port at a downstream end of the container and an outlet port at the downstream end of the container;
   a membrane container housing a cross-flow semipermeable membrane dividing the membrane container into a saline compartment and a desalinated compartment, the saline compartment comprising first and second cross-flow ports, the desalinated compartment comprising a desalinated water outlet port;
   a feed pump for supplying saline water from a saline water supply to the first inlet port of the partitioned container, the feed pump having an inlet and an outlet;
   a recirculation pump having an inlet connected to the second cross-flow port and an outlet connected to the second inlet port to feed saline water into the downstream compartment;
   a main valve connected between the outlet port and the first cross-flow port;
   a bypass valve connected between the feed pump outlet and the second cross-flow port;
   a purge valve connected on one side to the first cross-flow port and the main valve and on another side to a purge port; and
   a controller connected and configured to operate the desalination system, the controller configured to:
   in a first pressurisation stage, in which the purge valve is closed and the bypass valve and main valve are open, operate the recirculation pump to recirculate saline water through the saline compartment and operate the feed pump to provide a supply of saline water to the saline compartment;
   in a second pressurisation stage, in which the bypass valve and purge valve are closed and the main valve is open, operate the feed pump to provide a supply of saline water to the upstream compartment of the partitioned container, causing the partition to move and thereby flowing saline water from the downstream compartment into the saline compartment of the membrane container; and
   in a recharge stage, in which the bypass valve and purge valve are open and the main valve is closed, operate the recirculation pump and feed pump to feed saline water to the second inlet of the partitioned container and into the saline compartment of the membrane container via the second cross-flow port, causing saline water to flow out through the purge port via the first cross-flow port.

2. The desalination system of claim 1, further comprising an inlet valve connected between the feed pump outlet and the first inlet port.

3. The desalination system of claim 2, wherein:
   in the first pressurisation stage, the inlet valve is closed; and
   in the second pressurisation stage, the inlet valve is open.

4. The desalination system of claim 2, wherein the controller is configured and connected to control operation of one or more of the main valve, purge valve, inlet valve and bypass valve.

5. The desalination system of claim 2, wherein the controller is configured to open the inlet valve when a pressure between the feed pump and the inlet valve rises above a threshold pressure level.

6. The desalination system of claim 5, wherein the controller is configured to close the bypass valve when a pressure between the feed pump and the bypass valve rises above the threshold pressure level.

7. The desalination system of claim 4, wherein the controller is configured to open the inlet valve and close the bypass valve to end the first pressurisation stage and begin the second pressurisation stage.

8. The desalination system of claim 7 comprising a pressure sensor arranged to measure a pressure of the saline water provided by the feed pump, wherein the controller is configured to open the inlet valve and close the bypass valve when a pressure at the pressure sensor rises above a threshold pressure level.

9. The desalination system of claim 7 comprising a conductivity sensor arranged to measure an electrical conductivity of the saline water passing through the recirculation pump, wherein the controller is configured to open the inlet valve and close the bypass valve when a conductivity of saline water flowing through the recirculation pump rises above a threshold conductivity level.

10. The desalination system of claim 7, wherein the controller is configured to open the inlet valve and close the bypass valve when a threshold volume of the saline water has been provided by the feed pump in the first pressurisation stage.

11. A method of operating a desalination system, the desalination system comprising:

a partitioned container housing a movable partition partitioning the container into an upstream compartment and a downstream compartment each of variable volume, the partitioned container having a first inlet port at an upstream end of the container, a second inlet port at a downstream end of the container and an outlet port at the downstream end of the container;

a membrane container housing a cross-flow semipermeable membrane dividing the membrane container into a saline compartment and a desalinated compartment, the saline compartment comprising first and second cross-flow ports, the desalinated compartment comprising a desalinated water outlet port;

a feed pump for supplying saline water from a saline water supply to the first inlet port of the partitioned container, the feed pump having an inlet and an outlet;

a recirculation pump having an inlet connected to the second cross-flow port and an outlet connected to the second inlet port to feed saline water into the downstream compartment;

a main valve connected between the outlet port and the first cross-flow port;

a bypass valve connected between the feed pump outlet and the second cross-flow port; and a purge valve connected on one side to the first cross-flow port and the main valve and on another side to a purge port, the method comprising:

in a first pressurisation stage, in which the purge valve is closed and the bypass valve and main valve are open, operating the recirculation pump to recirculate saline water through the saline compartment and operating the feed pump to provide a supply of saline water to the saline compartment;

in a second pressurisation stage, in which the bypass valve and purge valve are closed and the main valve is open, operating the feed pump to provide a supply of saline water to the upstream compartment of the partitioned container, causing the partition to move and thereby flowing saline water from the downstream compartment into the saline compartment of the membrane container; and in a recharge stage, in which the bypass valve and purge valve are open and the main valve is closed, operating the recirculation pump and feed pump to feed saline water to the second inlet of the partitioned container and into the saline compartment of the membrane container via the second cross-flow port, causing saline water to flow out through the purge port via the first cross-flow port.

12. The method of claim 11, wherein the desalination system further comprises an inlet valve connected between the feed pump outlet and the first inlet port, the inlet valve being closed in the first pressurisation stage and open in the second pressurisation stage and the recharge stage.

13. The method of claim 12 wherein the first and second pressurisation stages and the recharge stage are repeated in sequence.

14. The method of claim 12, wherein the first pressurisation stage ends and the second pressurisation stage begins when a pressure in the saline water fed by the feed pump rises to a threshold pressure level.

15. The method of claim 12, wherein the first pressurisation stage ends and the second pressurisation stage begins when an electrical conductivity of saline water passing through the recirculation pump rises to a conductivity threshold level.

16. The method of claim 12, wherein the first pressurisation stage ends and the second pressurisation stage begins when a threshold volume of the saline water provided by the feed pump during the first pressurisation stage is reached.

\* \* \* \* \*